Sept. 18, 1956

P. K. WEIMER 2,763,714

COLOR TELEVISION

Filed April 17, 1953

3 Sheets-Sheet 1

INVENTOR.
Paul K. Weimer

BY [signature]
ATTORNEY

Sept. 18, 1956 P. K. WEIMER 2,763,714

COLOR TELEVISION

Filed April 17, 1953 3 Sheets-Sheet 2

INVENTOR.
Paul K. Weimer

BY Edwin J. Mitchell
ATTORNEY

Sept. 18, 1956 P. K. WEIMER 2,763,714

COLOR TELEVISION

Filed April 17, 1953

3 Sheets-Sheet 3

INVENTOR.
Paul K. Weimer
BY [signature]
ATTORNEY

United States Patent Office 2,763,714

Patented Sept. 18, 1956

2,763,714

COLOR TELEVISION

Paul K. Weimer, Princeton, N. J., assignor to Radio Corporation of America, a corporation of Delaware Application April 17, 1953, Serial No. 349,349

8 Claims. (Cl. 178—5.4)

The present invention relates to a system for translating images into electrical signals such as a color television signal. More particularly, this invention relates to means for deriving a reference frequency for proper identification of the color signals developed by a color pickup tube.

Light from an object can be broken up into its respective color components by means of appropriate optical color filters. By taking a number of such color filters in finely divided strips and placing them in close proximity so that they form a sequential color filter sheet a light pattern can be formed indicative of the object's color components. Also, when the above filter forms part of the optical system of a photoconductive type of television pickup tube, a charge pattern can be formed on the photo-conductor representative of such a light pattern.

In the co-pending application bearing Serial No. 344,497, filed March 25, 1953, and entitled "Cathode Ray Tube and Target," a color pickup tube of the photo-conductive type is described. An embodiment of the tube disclosed therein includes a target comprising a glass base; a plurality of red-pass, green-pass and blue-pass optical filter strips deposited thereon and interleaved in a predetermined sequence; a plurality of optically transparent, electrically conductive strips laid down on the filter strips such that each conductive strip is superimposed upon a respective one of the filter strips; a continuous layer of photo-conductive material, such as porous antimony sulphide, deposited over the conductive strips, and respective "red," "blue" and "green" bus bars connected to the appropriate ones of said conductive strips. In accordance with the present invention, reference signals are derived from the signal strips of such a target in response to the scanning of the target by the pickup tube beam, the reference signals being utilized to accurately control the derivation of respective component color signals from a composite signal, which may be derived from the return beam of the pickup tube, in accordance with one embodiment of the present invention, or may also be derived from the aforesaid signal strips in accordance with another embodiment of the present invention. Thus, in accordance with the invention, reference signals may be developed by a color image pickup tube without loss of resolution or reduction in signal to noise ratio of the output color signals, in contrast with prior art reference signal generating methods and apparatus.

Accordingly, one of the objects of this invention is to recover by frequency generating means in a color television camera tube a reference frequency for properly identifying the various color representative output signals of the camera tube.

Another object of this invention is to improve the overall color signal output of a color television camera without deteriorating resolution.

Another object of this invention is to improve the overall signal to noise ratio of the color camera tube output signal.

Other and incidental objects of this invention will become apparent to those skilled in the art from a reading of the following specification and an inspection of the accompanying drawings in which.

Figure 1:
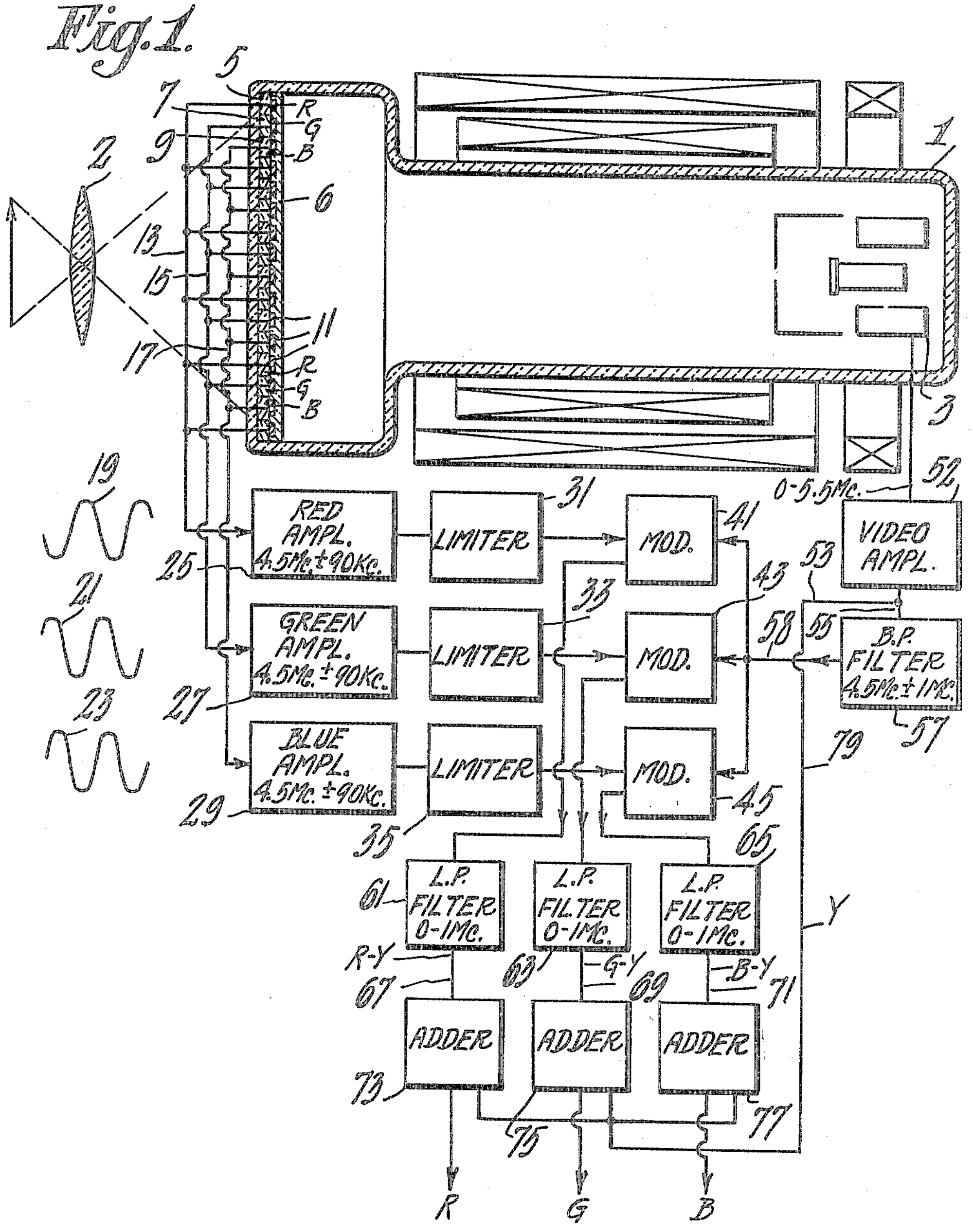
Figure 1 shows a color television camera incorporating one arrangement in accordance with the invention for recovering a reference frequency and using it in the recovery of the generated color signals.
Figure 2:
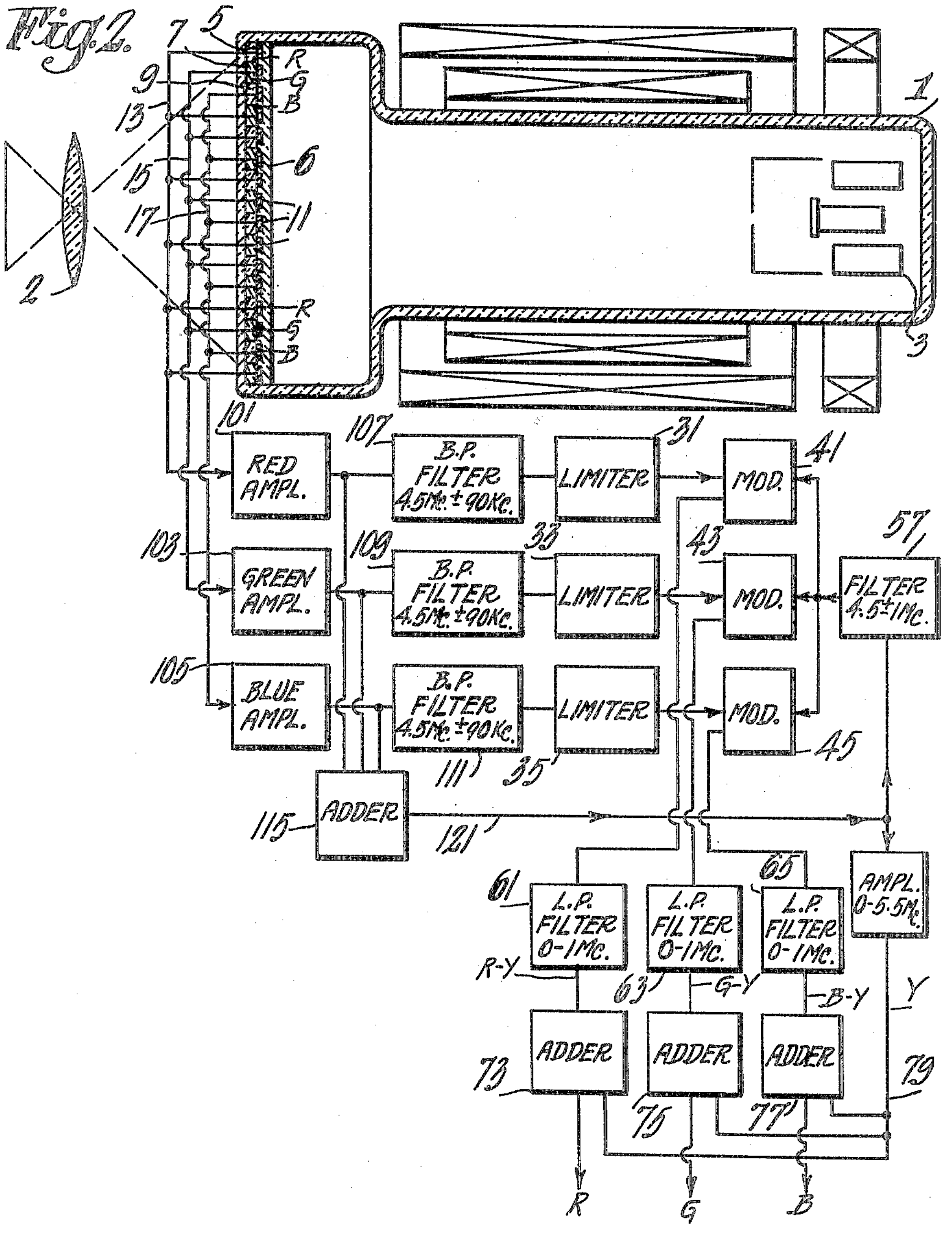
Figure 2 shows a color television camera incorporating a similar arrangement for deriving the reference frequency but incorporating a different arrangement, in accordance with the invention, for utilizing the reference frequency to recover the generated color signals.
Figures 3, 3A:
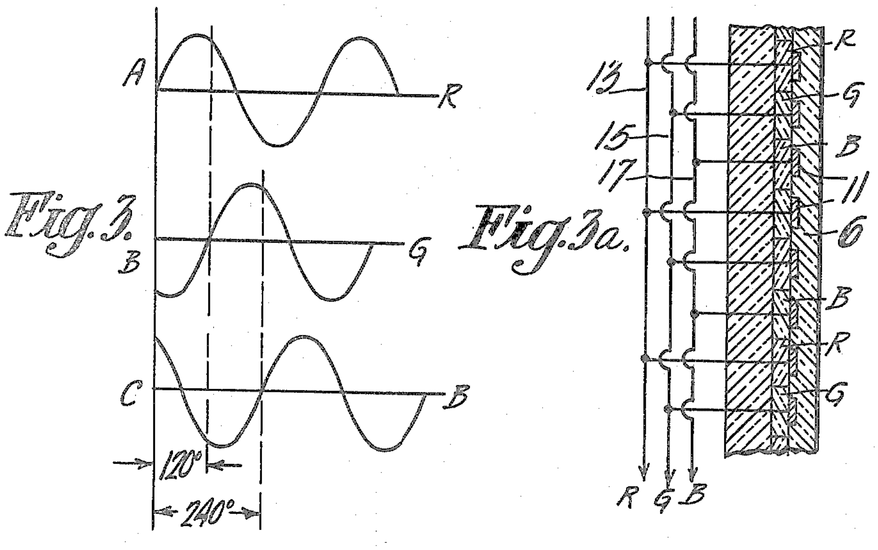
Figure 3 illustrates the type of reference frequency signals developed by the apparatus of Figures 1 and 2.
Figure 4:
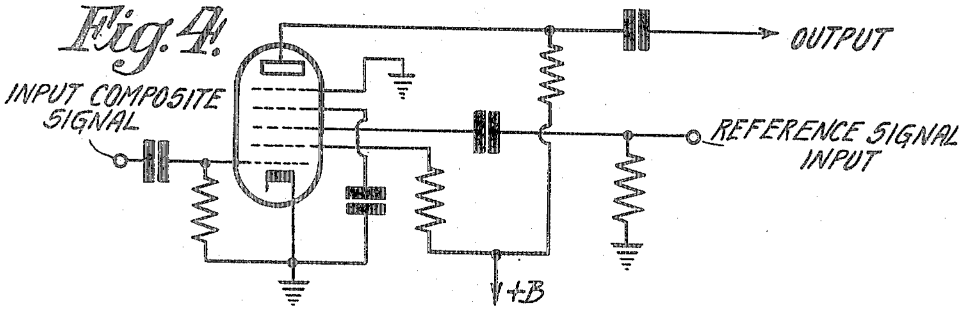
Figure 4 shows a type of modulator suitable for use in the systems of Figures 1 and 2.

Figure 3*a* show an enlarged section of the target electrode of the color image pickup tube employed in the cameras of Figures 1 and 2.

With reference to Figure 1, light from an object is first imaged upon the face of a vidicon tube by means of lens 2, said light passing through a transparent set of filter strips 5, 7 and 9. Light then penetrates certain transparent conductors 11 and is made to fall upon a photo-conductor 6 where it causes a dislodging of certain electrons the number being proportional to the amount of light impinging upon said photo-conductor. These electrons flow to the transparent conducting strips 11 and are held there and bound by the capacitive effect between said photo-conductors 6 and conducting strips 11. When an electron beam strikes that area where electrons were originally dislodged, the beam replenishes this area so that the capacitive charge originally there is neutralized. This causes the originally bound electrons on the conducting signal strips to be released. The release of the electrons causes a signal to be generated in accordance with the proportional amount of light falling upon the photoconductor 6. The return electron beam is minus a certain number of electrons as a result of supplying the electrons previously dislodged from the target by the light image. This return beam develops a signal which is representative of the amount of light which had been imaged upon said photoconductor 6. This in general is the operation of the vidicon.

Again with reference to Figure 1, a plurality of vertical filter color strips are laid down in a certain color sequence starting with red 5, then green 7, and then blue 9, and then repeated in this same sequence, the strips each being adjacent one to the other. Associated with each of these filter strips 5, 7 and 9 is a transparent conducting signal strip 11 which is in direct contact with the respective filter strips 5, 7 and 9. A light sensitive photoconductive material is then deposited over the signal strips to form the photo-conductor 6 as previously described. It may be noted here that all like elements have the same number throughout. Light from the scene is imaged by means of a lens system 2 upon photo-conductor 6. Each of the conducting signal strips 11 associated with the red filter strips 5 are tied to a common output lead 13. Likewise, all of the conducting signal strips 11 associated with the green filter strips 7 are tied to a common output lead 15, and all of the conducting strips 11 associated with the blue filter strips 9 are tied to a common output lead 17. Each one of these leads contains a signal 19, 21 and 23 generated by the scansion process. These signals are illustrated in Figure 3 wherein waveform "A" represents the signal 19 generated in the red output lead 13, waveform "B" the signal 21 generated in the green output lead 15, and waveform "C" the signal 23 generated in the blue output lead 17. As seen in Figure 3, there is a phase difference between each of the said generated signals. As a result of the scanning of the target there is developed a signal 19 of a given frequency $f_0$ at the red output lead 13. Signal 21 of the same frequency $f_0$, but having a phase displacement of 120°, is developed at the green output lead 15, and likewise, signal 23 is developed at the blue output lead 17, of the same frequency $f_0$ but phase displaced by 240° from the signal developed at the red output. Each of these signals is of an amplitude which varies with the amount of light which passes through the respective color filter strips. Hence signals 19, 21 and 23 may have varying degrees of amplitude depending upon the color information within the scene being televised.

Not only is a signal generated by the above mentioned means in the segmented strips but also a signal is generated in the electron beam as it is returned back to its point of origin as previously described in connection with the operation of the vidicon. That is, the beam is modulated in accordance with the charge laid down on the photoconductors 11 by the light source. This modulated return beam may be amplified as in an image orthicon type of pickup tube, in that the return beam can be multiplied by means of an electron multiplier 3. This return signal represents the total brightness signal plus the color information in the form of a modulated carrier signal.

The signals 19, 21 and 23 appearing in the respective output leads 13, 15 and 17 are passed through band pass amplifiers 25, 27 and 29 which each have a center frequency corresponding to $f_0$ (e. g. 4.5 megacycles). The amplifiers 25, 27 and 29 transmit a pass band of about 180 kilocycles, for example. A narrow pass band is desirably employed to reduce noise to a minimum since all that is desired to be passed is the reference carrier frequency signal. The passband should, however, be sufficiently wide to allow for variations in the carrier frequency generated due to the non-linearity of the scanning process. The output signals of amplifiers 25, 27 and 29 pass through limiters 31, 33 and 35 to eliminate any amplitude variations due to variation in the amount of color information passed by the respective filter strips. The reference frequency output signals from limiters 31, 33 and 35 are fed to modulators 41, 43 and 45.

The signal 51 carried by the return electron beam is passed through an amplifier 52 having a frequency cut-off at approximately 5.5 megacycles, for example. This allows the brightness signal, and the carrier frequency of 4.5 megacycles with corresponding color sidebands of plus or minus 1 megacycle to be passed. The output of this amplifier is then divided into two paths 53 and 55. The signal of path 55 is passed through band pass filter 57 which has a center frequency equal to that of the reference frequency carrier, namely 4.5 megacycles, and a bandwidth of 4.5 megacycles plus or minus 1 megacycle. The output of band pass filter 57 comprises the carrier and its color sidebands. This signal 58 is then fed in common to the modulators 41, 43 and 45. The respective outputs of modulators 41, 43 and 45 are fed to respective low pass filters 61, 63 and 65 the outputs of which comprise respective color difference signals. In other words, the output of low pass filter 61 is a red minus brightness signal 67 (R–Y), the output ol low pass filter 63 is a green minus brightness 69 (G–Y) and the output of low pass filter 65 is a blue minus brightness signal 71 (B–Y). A wideband brightness (Y) signal is passed by the other path 53 provided for the output signal derived from the return electron beam. The color difference signals 67, 69 and 71 and brightness signal of path 53 may be used to modulate the television transmitter directly. Or, if one wishes to view the picture directly on a color monitor the three color difference signals 67, 69 and 71 may be passed to respective adders 73, 75 and 77, for combination with the brightness signal of path 53. The output of said adders then represents the three desired color signals in proper form to be fed directly into the three guns of a tri-color kinescope. Thus, according to the form of the invention just described the return electron beam is used as a source of color signal rather than using the signals generated by the segmented strips directly. Use is made of the independent signals desrived by the segmented strips only to give the reference signal.

Figure 5:
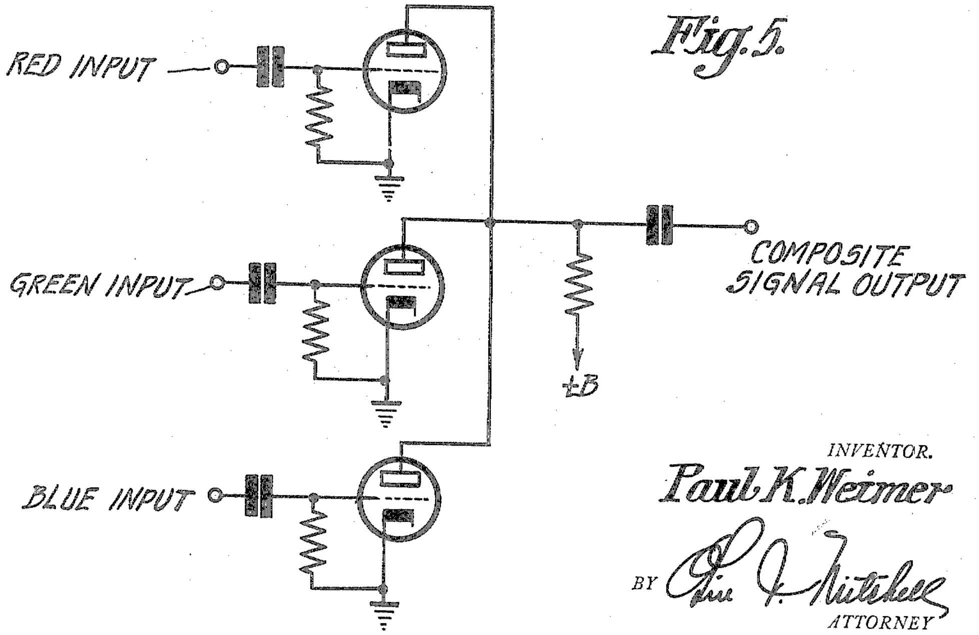
Figure 5 shows a schematic for a typical type of adder circuit also suitable for use in the systems of Figures 1 and 2.

Figure 2 shows another system for utilizing the signal generated by the segmented signal strips. The signal derived by means of the return electron beam is not utilized here as was previously described in connection with its necessity to overcome the larger noise factor resulting from the appreciable capacitive effects of the segmented strips. However, use is made in connection with Figure 2 of a system of amplifiers in which this capacitive effect is reduced to a minimum. To be more specific, effectively what happens because of the high capacity between the segmented strips is that a signal generated by one set of strips finds itself appearing across the input of not only the amplifier tied to said strips but also finds itself across the other amplifier inputs as well so that what was to appear as a signal across only one amplifier appears across all three amplifiers at the same time. This is one reason why low input impedance amplifiers are desired. Likewise noise appearing across one set of inputs finds itself across the other two inputs so that the overall noise factor has a tendency to multiply itself. However by the utilization of low impedance amplifiers, such as those described in a co-pending U. S. application of E. A. Goldberg, Ser. No. 348,764, filed April 14, 1953, now U. S. Patent No. 2,714,129, issued July 26, 1955, which achieve a low input impedance dynamically in a desired range, this effective cross-coupling can be reduced to a minimum in such range. It has been found that when the outputs of the three amplifiers 25, 27 and 29, taking the form disclosed in the above-mentioned Goldberg patent, are added directly, the total noise current tends to cancel out because of the nature of the cross-coupling capacity of the three sets of target strips. This fact makes possible the system shown in Figure 2. Here the three signals 19, 21 and 23 generated by the means previously discussed are fed to the wideband amplifiers 101, 103 and 105 and the output of said amplifiers fed to a common adder 115, a schematic of which is shown by Figure 5. The respective outputs of said amplifiers are also passed through band pass filters 107, 109 and 111 and their outputs are limited by the amplifiers 31, 33 and 35. The purpose of this is to recover, as in Figure 1, the reference frequency carrier necessary to identify the color signals in their proper phase relation. The respective outputs of these limiters are then fed to modulators 41, 43 and 45 as previously discussed in connection with Figure 1. The output of adder 115 represents the overall composite color signal in that it contains the color information and the normal brightness signal. This composite signal 121 is a low noise signal comparable to the return beam signal as previously described in connection with Figure 1 and is divided into two paths similar to the system described in connection with Figure 1. The output of band pass filter 57 is fed to modulators 41, 43 and 45, the outputs of which are fed to the corresponding low pass filters 61, 63 and 65. The outputs of said filters are in the form of color difference signals as previously discussed with reference to Figure 1. These three color difference signals are then passed to adders 73, 75 and 77 and added to the normal brightness signal 79. The outputs of adders 73, 75 and 77 comprise the respective component color signals R, G and B.

Having thus described my invention, what is claimed is:

1. In a color television image pickup system, the combination comprising an image pickup tube having a plurality of intermingled sets of different color responsive target areas arranged in regular color sequence, and a reference signal generating grid-like element arranged in the vicinity of said target areas and having sets of grids regularly positioned with respect to said different color responsive sets of target areas, means for generating and deflecting an electron beam relative to said sets of grids to develop therein respective reference signals, means for recovering a composite signal from a return electron beam responsive to signal variations in said target areas, a plurality of modulators each having input and output circuits, means for impressing said composite signal upon the input circuits of all of said modulators, means for impressing said reference signals respectively upon said modulators in a manner to produce in the output circuits of said modulators respective signals representing the different component colors of said subject.

2. A color television image pickup system comprising the combination of an image pickup tube having a plurality of intermingled sets of different color responsive target areas arranged in regular color sequence, and a reference signal generating grid-like element arranged in the vicinity of said target areas and having sets of conducting strips regularly positioned with respect to said different color responsive sets of target areas, means for generating an electron beam, and means for deflecting said electron beam relative to said grid-like element to develop respective signals in said conducting strip sets, an adder having an input and output circuits, means for impressing said respective developed signals upon the input of said adder to form an output composite signal, a plurality of modulators each having input and output circuits, means for impressing said composite signal upon the input circuits of all of said modulators, means for deriving respective reference signals from said respective developed signals, and means for impressing said reference signals respectively upon said modulators in a manner to produce in the output circuits of said modulators respective signals representing the different component colors of said subject.

3. A color television pickup tube system comprising in combination, a pickup tube including an electron target structure comprising a plurality of interleaved sets of optical filter strips having respectively different component color passbands and a corresponding plurality of interleaved sets of conducting strips respectively associated with said filter strip sets, means for generating an electron beam, means for scanning said target structure with said electron beam, means for developing a composite signal including information relative to the different color components of a subject image in response to said scanning, means for deriving a reference signal from at least one of said conducting strip sets in response to said scanning, and means for utilizing said reference signal to derive a component color signal from said composite signal.

4. A pickup tube system in accordance with claim 3 wherein said composite signal is derived from the return beam of said pickup tube.

5. A pickup tube system in accordance with claim 3 wherein said composite signal developing means includes means for combining a plurality of signals derived from respective ones of said conducting strip sets.

6. A color television pickup tube system comprising, in combination, an image pickup tube including a target comprising a plurality of interleaved sets of optical filter strips of respectively different component color response positioned to intercept light from a subject to be televised, and a plurality of interleaved sets of conducting strips positioned in substantial registry with the respective optical filter strip sets, means for developing an electron beam in said pickup tube deflecting means for causing said electron beam to periodically traverse the conducting strip sets of said target, means for deriving from said pickup tube in response to said periodic traversals a composite signal including information concerning each of the respective color components of the subject, a plurality of modulators each having input and output circuits, means for impressing said composite signal upon the input circuits of all of said modulators, means for deriving respective reference signals from said conducting strip sets in response to said periodic traversals, and means for impressing each of the respective reference signals upon the input circuit of a respectively different one of said modulators whereby each of said modulators provides an output signal containing information concerning but a respective one of said color components.

7. A color television pickup system comprising, in combination, a pickup tube including an electron target structure comprising a plurality of interleaved sets of conducting strips, the conducting strips of each of said sets being in registry with target areas responsive to light of a respectively different component color from a subject to be televised, said pickup tube also including means for generating an electron beam, means for causing said beam to trace a scanning raster upon said target structure, and means for collecting the electrons of said beam returned from said target structure throughout said raster tracing; means for deriving respective reference signals from said conducting strip sets in response to said raster tracing; a plurality of modulators; means for applying the return beam signal appearing at said collecting means to each of said plurality of modulators; and means for additionally applying to each of said plurality of modulators a respectively different one of said reference signals.

8. A color television camera comprising in combination a color image pickup tube including an electron target structure, means for developing an electron beam, and means for causing said beam to trace a scanning raster upon said target structure; said target structure comprising a plurality of interleaved sets of optical filter strips having respectively different component color passbands and through which light from a subject to be televised passes, and a corresponding plurality of interleaved sets of conducting signal strips in registry with said interleaved filter strip sets; means for deriving from said pickup tube throughout the tracing of said raster a composite signal which includes respective components representative of different component color aspects of said subject; means for deriving respective reference signals from each of said conducting strip sets throughout said raster tracing; and means for utilizing each of said respective reference signals to separate a respectively different one of said components from said composite signal.

References Cited in the file of this patent

UNITED STATES PATENTS

| | | |
|---|---|---|
| 2,586,482 | Rose | Feb. 14, 1952 |
| 2,615,976 | Rose | Oct. 28, 1952 |
| 2,621,245 | Kell | Dec. 9, 1952 |
| 2,680,147 | Phodes | June 1, 1954 |
| 2,698,874 | Borkan | Jan. 4, 1955 |